(No Model.)
G. H. SMITH.
EVAPORATING PAN FOR SALT, &c.
No. 350,999. Patented Oct. 19, 1886.
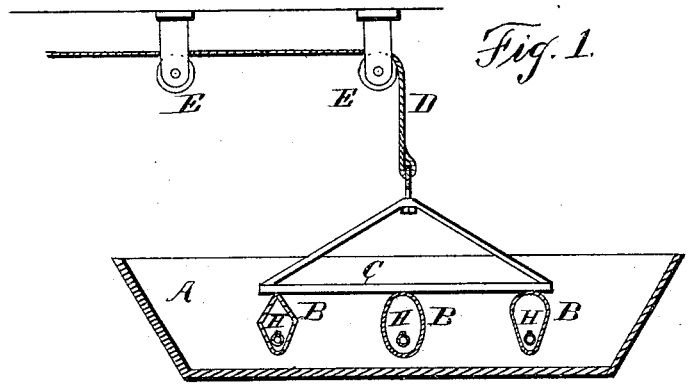
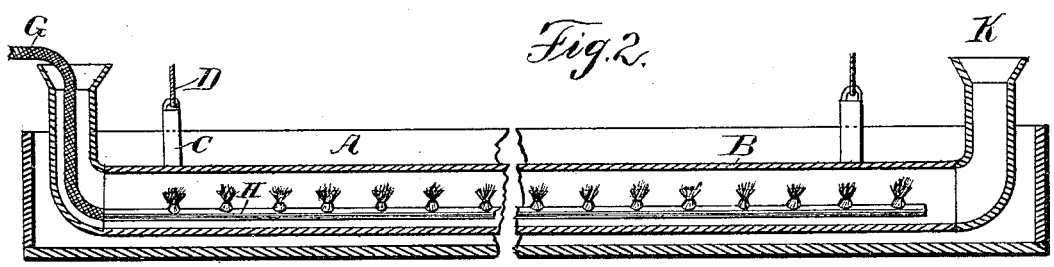
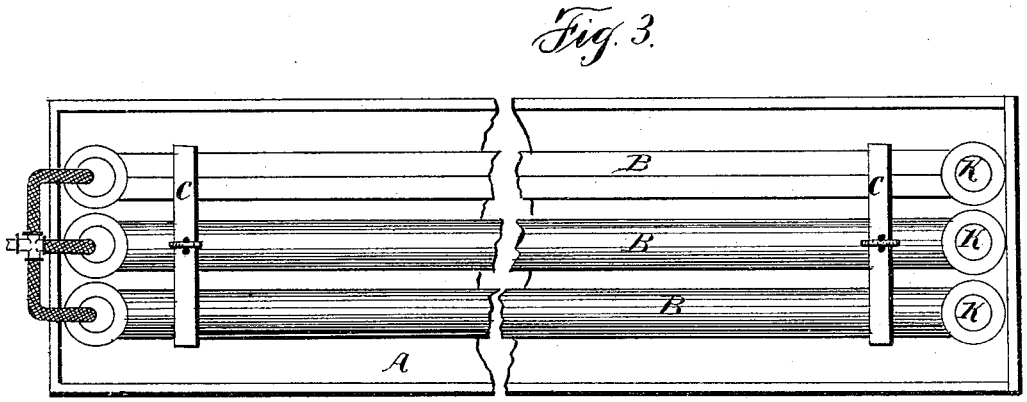
Witnesses:
C. W. H. Brown.
M. L. Williams.
Inventor:
George H. Smith
By Wallace H. Bartlett
Atty.

UNITED STATES PATENT OFFICE.

GEORGE H. SMITH, OF HAVERSTRAW, NEW YORK.

EVAPORATING-PAN FOR SALT, &c.

SPECIFICATION forming part of Letters Patent No. 350,999, dated October 19, 1886.

Application filed April 6, 1886. Serial No. 197,999. (No model.)

*To all whom it may concern:*

Be it known that I, GEORGE H. SMITH, residing at Haverstraw, in the county of Rockland and State of New York, have invented certain new and useful Improvements in Evaporating-Pans, of which the following is a specification, reference being had therein to the accompanying drawings.

This invention relates to evaporating-pans or grainers used in the manufacture of salt.

The invention consists in a mechanism by which the salt-brine may be evaporated by the combustion of gas, especially natural gas, in tubes in the pan or grainer, the object of the invention being to apply the heat developed by such combustion in the best manner.

In the drawings, Figure 1 is a cross-section of a pan or grainer containing a series of evaporating-pipes arranged for gas-combustion.
Fig. 2 is a broken longitudinal section of a pan or grainer and one of its heating-pipes arranged for gas-combustion. Fig. 3 is a broken plan of a grainer with contained gas-pipes.

A represents a salt pan or grainer, which may be of usual or any known construction.

B indicates a combustion-pipe, which may be oval or egg-shaped in cross-section, or of a diamond shape, the horizontal diameter being the shorter. Any number of these pipes may be arranged in the pan or grainer, so as to be immersed in the brine when the pan is full. If a series of pipes are used, they are preferably supported by a suitable frame-work, C, so that all may be lifted from the brine simultaneously. The frame-work C may be hinged to the edge of the grainer, or be hung so that the entire system of tubes may be lifted out of the brine by pulling on ropes D, which pass over pulleys E E. A flexible or jointed pipe, G, conveys the gas to the burner-tube H, which is within the combustion-tube B. The tube G connects with any convenient source of gas or vapor supply, and may convey natural gas, manufactured gas, or combustible vapor to the combustion-tube. The burner-tube H extends lengthwise through the combustion-tube B, being near the lower part of the tube B. The burner-tube is provided with numerous burners, jets, or apertures, *i i*, &c., through which the gas escapes into the combustion-pipe B, where it is ignited. Air is drawn into the pipes B at the same end the gas enters. Each combustion-tube B has a chimney or escape, K, above the surface of the brine in the grainer, and this chimney may extend as far above the surface of the brine as is desirable. The smoke or soot formed by imperfect combustion may be conveyed to a permanent flue if found necessary or desirable, due attention being had to the removability of the combustion-tube from the pan or grainer.

When a pan or grainer is prepared with gas-burning pipes according to my invention, the gas is introduced through the pipe G and enters the perforated pipe H, which is inside the combustion-pipe B. The gas being ignited inside this latter pipe, a large heating-surface is presented to the brine surrounding the same. The egg shape or oval form of the pipe not only increases the heating-surface, but presents such a form to the brine that salt crystals will not readily deposit on said pipe, but will fall to the bottom of the pan or grainer. There should be little smoke caused by such combustion if nearly perfect. What there is will be conveyed away by the chimney-flues K, which may have a wire-cloth screen at top. The salt, as it deposits, may be raked from under the tubes B by any well-known system of rakes. When more convenient for the purpose of raking, or when desirable for any other purpose, the entire system of heating-pipes may be lifted bodily from the pan or grainer by means of the ropes and pulleys described, and the salt deposit in the bottom of the pan may then be removed by rakes or hoes in usual manner. It will be observed that when the heating-pipes are lifted from the pan free access may be had to all parts of the latter. The chimneys or pipes K may extend any distance upward, so as to give a forced draft, but if a considerable height is necessary these pipes will preferably be in sections.

I claim—

1. The combination, with an evaporating pan or grainer, of a submerged combustion-pipe therein, a gas-pipe within said combustion-pipe, and a gas-supply pipe leading to the same, substantially as described.

2. The combination, with an evaporating pan or grainer, of a submerged combustion-pipe therein, the same being of greater diameter in vertical than in lateral direction, and having a gas-pipe within said oval combustion-pipe, and a gas-supply pipe leading to said gas-pipe, as set forth.

3. The combination, with an evaporating pan or grainer, of a removable combustion-pipe within the same and mechanism by which the combustion-pipe may be lifted out of the pan or grainer, substantially as described.

4. The combination, with an evaporating pan or grainer, of a combustion-tube therein, a gas-pipe within the combustion-tube, and a flexible supply-pipe leading to the gas-pipe, as set forth.

5. The combination, with a salt-evaporating pan or grainer, of a combustion-tube within the same, a gas-pipe within said combustion-tube, a flexible or jointed gas-supply pipe leading thereto, and a lifting mechanism by which the combustion-tube may be lifted from the pan.

6. The combination, with a salt-evaporating pan, of a combustion-pipe within the same, having a chimney leading above the surface of the brine in the pan, a gas-burner pipe within the combustion-pipe, and a gas-supply pipe leading from outside the pan to said gas-pipe, as set forth.

In testimony whereof I affix my signature in presence of two witnesses.

GEORGE H. SMITH.

Witnesses:
H. C. VER VALEN,
S. J. DE BAUN.